(12) United States Patent
Han et al.

(10) Patent No.: US 12,399,039 B2
(45) Date of Patent: Aug. 26, 2025

(54) UNDERGROUND CABLE LOCALIZATION BY FAST TIME SERIES TEMPLATE MATCHING

(71) Applicant: NEC Laboratories America, Inc., Princeton, NJ (US)

(72) Inventors: Shaobo Han, Princeton, NJ (US); Ming-Fang Huang, Princeton, NJ (US); Yuheng Chen, South Brunswick, NJ (US); Ting Wang, West Windsor, NJ (US); Sheng Zhong, Albuquerque, NM (US)

(73) Assignee: NEC Corporation, Tokyo (JP)

( * ) Notice: Subject to any disclaimer, the term of this patent is extended or adjusted under 35 U.S.C. 154(b) by 238 days.

(21) Appl. No.: 17/979,755

(22) Filed: Nov. 2, 2022

(65) Prior Publication Data
US 2023/0142932 A1     May 11, 2023

Related U.S. Application Data

(60) Provisional application No. 63/276,054, filed on Nov. 5, 2021.

(51) Int. Cl.
*G01D 5/353* (2006.01)
*G01H 9/00* (2006.01)

(52) U.S. Cl.
CPC ......... *G01D 5/35358* (2013.01); *G01H 9/004* (2013.01)

(58) Field of Classification Search
CPC ................................................. G01D 5/35358
(Continued)

(56) References Cited

U.S. PATENT DOCUMENTS

2020/0249076 A1\* 8/2020 Ip ........................... G01H 9/004
2020/0401784 A1\* 12/2020 Salemi ................... G06F 18/243
(Continued)

FOREIGN PATENT DOCUMENTS

WO       2021207102 A1     10/2021

*Primary Examiner* — Walter L Lindsay, Jr.
*Assistant Examiner* — Philip T Fadul
(74) *Attorney, Agent, or Firm* — Joseph Kolodka (57) ABSTRACT

A method for underground cable localization by fast time series template matching and distributed fiber optic sensing (DFOS) includes: providing the DFOS system including a length of optical sensor fiber; a DFOS interrogator in optical communication with the optical sensor fiber, said DFOS interrogator configured to generate optical pulses, introduce the generated pulses into the length of optical sensor fiber, and receive backscattered signals from the length of the optical sensor fiber; and an intelligent analyzer configured to analyze DFOS data received by the DFOS interrogator and determine from the backscattered signals, vibrational activity occurring at locations along the length of the optical sensor fiber; deploying a programmable vibration generator to a field location proximate to the length of optical sensor fiber; transmitting to the programmable vibration generator a unique vibration pattern to be generated by the vibration generator; and operating the programmable vibration generator to generate the unique vibration pattern transmitted; and operating the DFOS system and collecting/analyzing the determined vibrational activity to further determine vibrational activity indicative of the unique vibration pattern generated by the vibration generator.

6 Claims, 12 Drawing Sheets

(58) Field of Classification Search
USPC .......................................................... 73/655
See application file for complete search history.

(56) References Cited

U.S. PATENT DOCUMENTS

| | | | |
|---|---|---|---|
| 2021/0278314 A1* | 9/2021 | Xia | ........................ G01M 7/00 |
| 2021/0311186 A1 | 10/2021 | Huang et al. | |
| 2021/0312801 A1 | 10/2021 | Ji et al. | |

* cited by examiner

UNDERGROUND CABLE LOCALIZATION BY FAST TIME SERIES TEMPLATE MATCHING

CROSS REFERENCE

This application claims the benefit of U.S. Provisional Patent Application Ser. No. 63/276,054 filed 5 Nov. 2021, the entire contents of which being incorporated by reference as if set forth at length herein.

TECHNICAL FIELD

This disclosure relates generally to distributed fiber optic sensing (DFOS) systems, methods, and structures. More particularly, it discloses underground cable localization using fast time series template matching in conjunction with DFOS.

BACKGROUND

A significant challenge facing global telecommunications service providers is the efficient management of millions of miles of buried and suspended optical fiber that comprise network infrastructures. Accordingly, systems, methods, and structures that facilitate the localization of buried and suspended optical fiber would represent a welcome addition to the art.

SUMMARY

An advance in the art is made according to aspects of the present disclosure directed to distributed fiber optic sensing underground cable localization using fast time series data template matching.

In sharp contrast to the prior art, systems and methods according to aspects of the present disclosure provide cable localization based on a time series similarity search. Our techniques may be used to quickly search either specially designed vibration patterns, which are made with distinguishable on-off patterns from the background noises, or actual field vibration signal collected from a secondary point sensor (e.g., cell-phone, tablet or accelerometer). Additionally, our inventive systems and methods work with different signal patterns produced by different vibrators, of different durations, and at various locations (e.g., buried or aerial portions of the cables) and provides instant feedback on a limited resource platform (e.g., laptop or edge devices) such that a field technician does not need to wait more than a few seconds to receive results.

Our inventive method for underground cable localization by fast time series template matching and distributed fiber optic sensing (DFOS) includes: providing the DFOS system including a length of optical sensor fiber; a DFOS interrogator in optical communication with the optical sensor fiber, said DFOS interrogator configured to generate optical pulses, introduce the generated pulses into the length of optical sensor fiber, and receive backscattered signals from the length of the optical sensor fiber; and an intelligent analyzer configured to analyze DFOS data received by the DFOS interrogator and determine from the backscattered signals, vibrational activity occurring at locations along the length of the optical sensor fiber; deploying a programmable vibration generator to a field location proximate to the length of optical sensor fiber; transmitting to the programmable vibration generator a unique vibration pattern to be generated by the vibration generator; and operating the programmable vibration generator to generate the unique vibration pattern transmitted; and operating the DFOS system and collecting/analyzing the determined vibrational activity to further determine vibrational activity indicative of the unique vibration pattern generated by the vibration generator.

BRIEF DESCRIPTION OF THE DRAWING

A more complete understanding of the present disclosure may be realized by reference to the accompanying drawing in which:

FIG. 7(A) and FIG. 7(B) are a pair of plots of Amplitude vs Time for real vibration signals from a waterfall image in which FIG. 7(A) vertical lines are the starting and ending positions of the sliding window in which, a sub-sequence is most similar to a query and FIG. 7(B) shows both query and sub-sequence overlay according to aspects of the present disclosure;

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we begin by noting that distributed fiber optic sensing (DFOS) is an important and widely used technology to detect environmental conditions (such as temperature, vibration, acoustic excitation vibration, stretch level etc.) anywhere along an optical fiber cable that in turn is connected to an interrogator. As is known, contemporary interrogators are systems that generate an input signal to the fiber and detects/analyzes the reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. DFOS can also employ a signal of forward direction that uses speed differences of multiple modes. Without losing generality, the following description assumes reflected signal though the same approaches can be applied to forwarded signal as well.

Figure 1A:
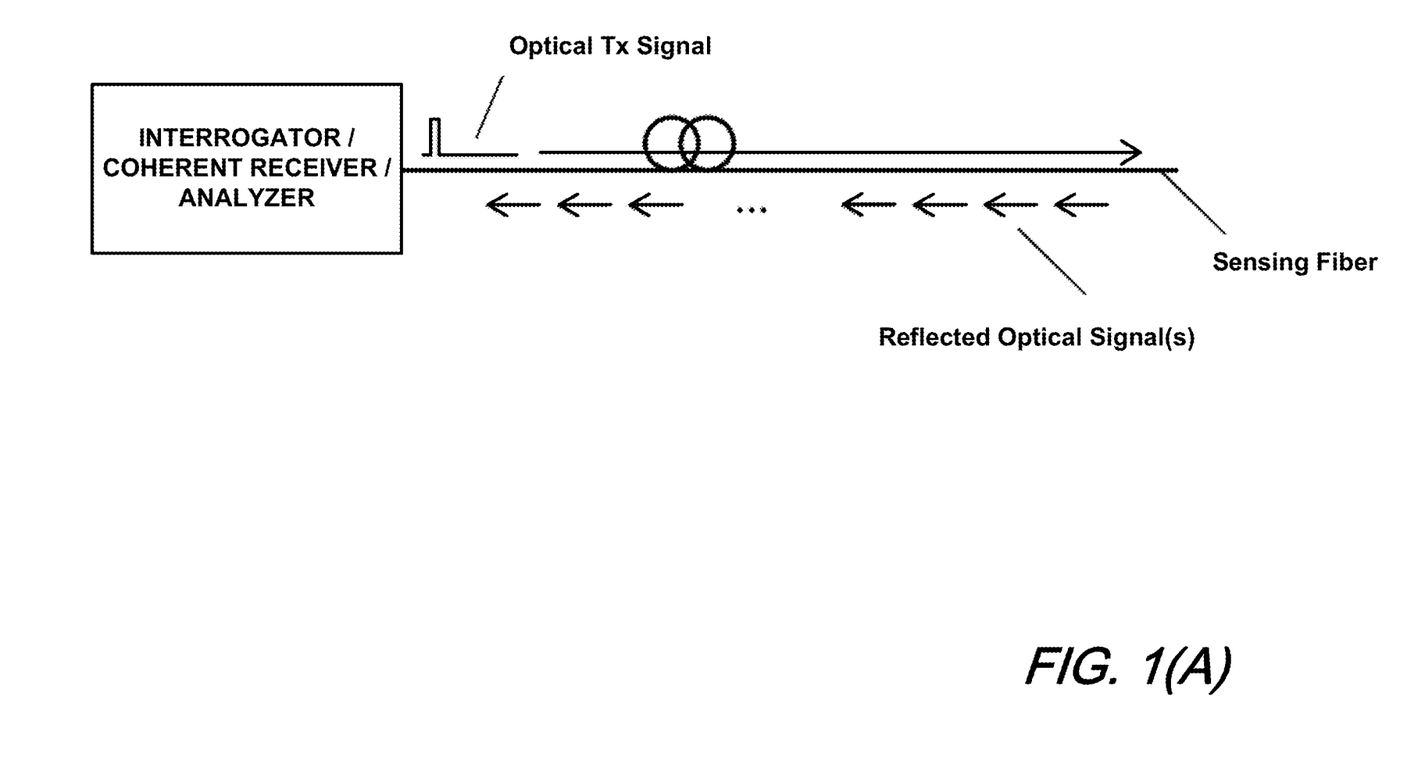
FIG. 1(A) is a schematic diagram illustrating a DFOS system according to aspects of the present disclosure.

FIG. 1(A) is a schematic diagram of a generalized, prior-art DFOS system. As will be appreciated, a contemporary DFOS system includes an interrogator that periodically generates optical pulses (or any coded signal) and injects them into an optical fiber. The injected optical pulse signal is conveyed along the optical fiber.

At locations along the length of the fiber, a small portion of signal is reflected and conveyed back to the interrogator. The reflected signal carries information the interrogator uses to detect, such as a power level change that indicates—for example—a mechanical vibration. While not shown in detail, the interrogator may include a coded DFOS system that may employ a coherent receiver arrangement known in the art such as that illustrated in FIG. 1(B).

Figure 1B:
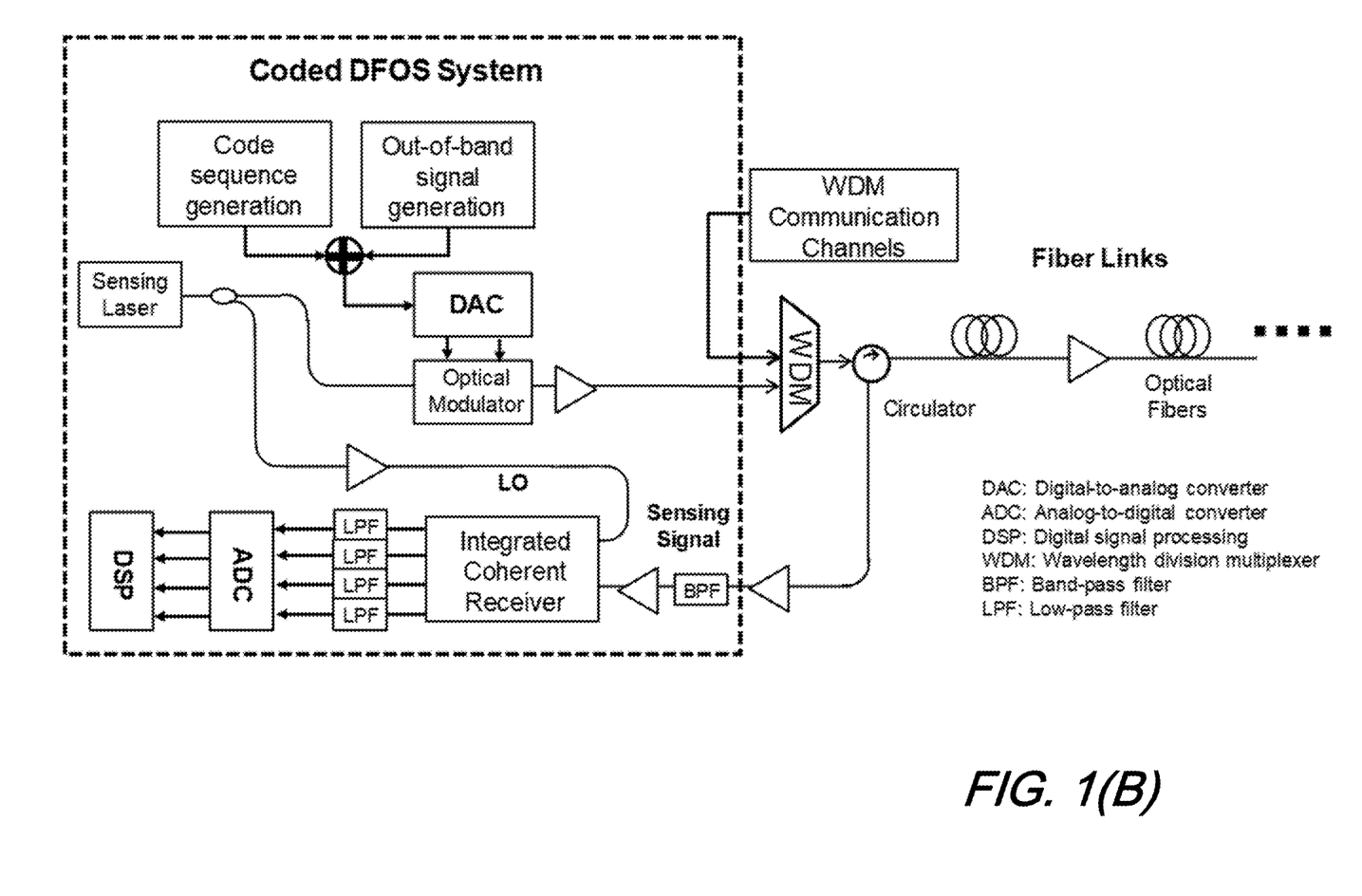
FIG. 1(B) is a schematic diagram illustrating a coded constant-amplitude DFOS system with out-of-band signal generation according to aspects of the present disclosure.

The reflected signal is converted to electrical domain and processed inside the interrogator. Based on the pulse injection time and the time signal is detected, the interrogator determines at which location along the fiber the signal is coming from, thus able to sense the activity of each location along the fiber.

Those skilled in the art will understand and appreciate that by implementing a signal coding on the interrogation signal enables the sending of more optical power into the fiber which can advantageously improve signal-to-noise ratio (SNR) of Rayleigh-scattering based system (e.g. distributed acoustic sensing or DAS) and Brillouin-scattering based system (e.g. Brillouin optical time domain reflectometry or BOTDR).

As currently implemented in many contemporary implementations, dedicated fibers are assigned to DFOS systems in fiber-optic cables—physically separated from existing optical communication signals which are conveyed in different fiber(s). However, given the explosively growing bandwidth demands, it is becoming much more difficult to economically operate and maintain optical fibers for DFOS operations only. Consequently, there exists an increasing interest in integrating communications systems and sensing systems on a common fiber that may be part of a larger, multi-fiber cable or a common fiber that simultaneously carries live telecommunications traffic in addition to the DFOS data.

Operationally, we assume that the DFOS system will be Rayleigh-scattering based system (e.g., distributed acoustic sensing or DAS) and Brillouin-scattering based system (e.g., Brillouin optical time domain reflectometry or BOTDR) and may include a coding implementation. With such coding designs, such systems will be most likely be integrated with fiber communication systems due to their lower power operation and will also be more affected by the optical amplifier response time.

In the arrangement illustratively shown in the block diagram, we assume that the coded interrogation sequence is generated digitally and modulated onto the sensing laser via digital-to-analog-conversion (DAC) and an optical modulator. The modulated interrogation sequence may be amplified to optimal operation power before being directed into the fiber for interrogation.

Advantageously, the DFOS operation may also be integrated together with communication channels via WDM in the same fiber. Inside the sensing fiber, the interrogation sequence and the returned sensing signal may be optically amplified—either via discrete (EDFA/SOA) or distributed (Raman) methods. A returned sensing signal is routed to a coherent receiver after amplification and optical band-pass filtering. The coherent receiver detects the optical fields in both polarizations of the signal, down-converting them to 4 baseband lanes for analog-to-digital conversion (ADC) sampling and digital signal processor (DSP) processing. As those skilled in the art will readily understand and appreciate, the decoding operation is done in the DSP to generate the interrogated Rayleigh or Brillouin response of the fiber, and any changes in the response are then identified and interpreted for sensor readouts.

With continued reference to the figure, since the coded interrogation sequence is generated digitally, the out-of-band signal is also generated digitally, and then combined with the code sequence before waveforms are created by the DAC. When generated together digitally, the out-of-band signal will only be generated outside the time period of the code sequence, so when added together, the combined waveform will have a constant amplitude.

As those skilled in the art will understand and appreciate, DFOS/DAS systems have been shown to detect, record and listen to acoustic vibrations in the audible frequency range. However, one of the limiting factors for sensitivity is the physical layout of the fiber optic cable used as the sensor.

For outdoor applications, telecom grade thick fiber cables are not physically very responsive to low amplitude, vibrations in the audible range. Consequently, acoustic signal quality greatly depends on the fiber type, layout and how the acoustic pressure waves are coupled to the fiber cable.

As will be readily understood, fiber optic cables are widely deployed in both urban and rural areas and advantageously provide greater bandwidths, transmission distances, and reliability.

To support such deployment, we now disclose a novel underground cable localization method based on time series similarity search. As we shall describe, our method quickly searches either specially designed vibration patterns—which are made with distinguishable on-off patterns from the background noises—or actual field vibration signals collected from a secondary point sensor (e.g., cell-phone, tablet or accelerometer). Advantageously, it operates with different signal patterns produced by different vibrators, exhibiting different vibration durations, occurring at various locations along the fiber optic cable (e.g., buried or aerial portions of the cables). It provides instant feedback on a limited resource platform (e.g., laptop or edge devices) such that the field technician does not need to wait more than a few seconds to receive results and therefore assists field technicians' localization of underground fiber cable quicker and easier than possible with prior art techniques.

We may highlight a limited set of differences between our present disclosure and the prior art.

Problems/Difference with Existing Approaches or Prior Arts
Manual Localization and Matching Manual search processes can be done by human visual inspecting, but such operation takes extra human labor and time and is error-prone.

Pattern Recognition by Image Processing

To automate this process, some image pattern detection methods can be adopted. However, the traditional edge detection methods only work for patterns that have simple shape and structure, for instance a vertical bar of certain width and length on the waterfall image, this pattern can be generated by using a vibrator to continuously vibrate near the fiber for a certain time period. Depending on the testing location, the waterfall image can be very noisy which contains continuous traffics signals and other vibration signals from surroundings. For a simple shape pattern to be differentiable from other sources, it needs to be long and wide enough, this brings more requirements on the testing device and testing time duration. The traditional image pattern detectors are harder to design for special structure patterns cannot achieve consistent results under various conditions, and complexity usually has negative effects on the computation performance.

Supervised Learning Approaches Such as Neural Networks

A neural network-based image pattern detector can perform well—if the model has been trained in advance with a sufficient number of good quality training examples. However, such training is consuming of both time and labor to collect a sufficient large dataset at various places under different condition, since such signals do not naturally exist in a waterfall image In sharp contrast to these approaches, our inventive AI module for fast time series template matching automatically finds a signal pattern within a large-scale waterfall image of the whole route (tens of kilometers). As those skilled in the art will appreciate, such operation includes the following features namely, it does not need annotated training data; it works with any customized signal patterns; it is robust to variants caused by sensing distances, environment factors, and vibrating source strengths; and it provides instant/real-time results while requiring only limited computing resources.

As those skilled in the art will understand and appreciate, these features bring many practical benefits.

Low-False Alarm Rate

Since our inventive technique does not require any training data and can work with any pattern, we can pre-design a set of synthetic signals and then verify on previous daily waterfall data to select a few candidate patterns that results in the lowest false positive rate.

Customizable Patterns

Even if the signal changed later, our inventive technique seamlessly transfers without re-training the model.

Reduced Operation Time and Device Weight

A designed signal pattern is detected easier—even with a shorter and weaker pattern or one captured from a noisy environment. Consequently, it makes the overall tasks easier to complete, with a portable, smaller vibration source as signal source. Field personnel will appreciate a lighter, smaller, more compact vibration source device which is more portable than current alternatives. Unfortunately, the vibratory signals produced by such vibrator are usually not consistent and are more easily compromised by other sources which in turn appears a broken pattern on waterfall image.

Real-Time Feedback

Since our inventive technique and systems are lightweight, they only require a mid-level laptop processor. As a result, any necessary computation is advantageously performed locally (without the need to transmit data to the Cloud Computing Systems) and real-time results—which is a key advantage for users—are available in-field in real-time. As a result, a user knows whether a targeted cable is underground immediately.

Figure 2:
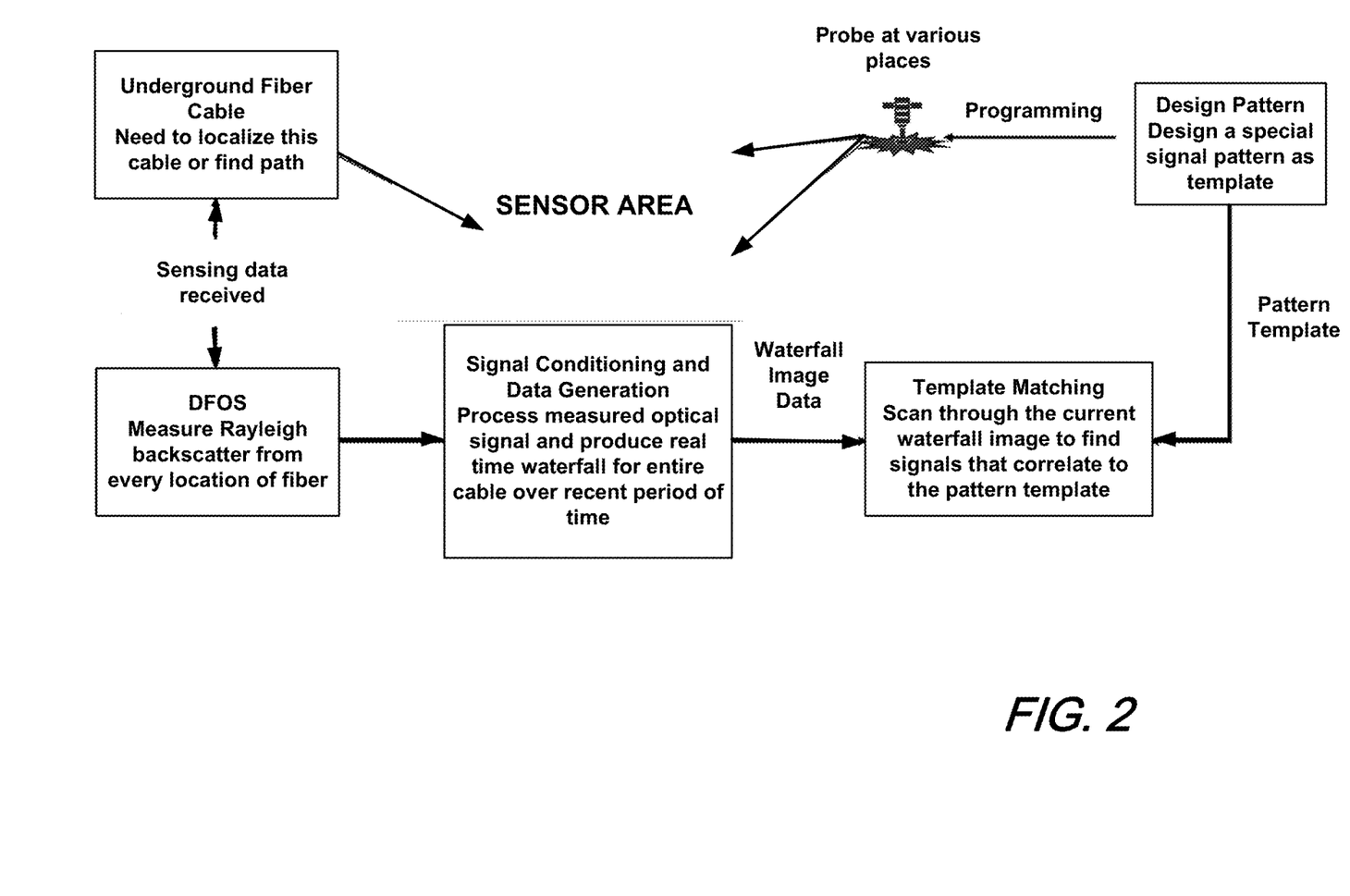
FIG. 2 is a schematic diagram illustrating an overview of a method according to aspects of the present disclosure.

FIG. 2 is a schematic diagram illustrating an overview of a method according to aspects of the present disclosure. With reference to that figure it may be observed that hardware components include:

The optical fiber. It can be existing deployed telecom fiber cables or newly deployed dedicated fibers.

Distributed fiber optic sensing system (DFOS). It can be a DAS or DVS that can detect the vibration signal along the optical fiber, and produces waterfall signal image continuously in real time.

A portable vibrating device like hammer drill or vibrator, serving as signal source.

A programmable controller that can make the vibrator work as pre-defined mode or an audio recording device to collect the field target signal.

Analyzing AI procedures includes:

A time series template matching procedure that search a target signal pattern on the raw waterfall data, it outputs N regions on the waterfall image that one of them or none contains the signal corresponding to the vibration of the testing vibrator. This is the key element of this invention, this module can work with any signal pattern without pre-training, and the computation is efficient enough to give results in real-time.

A region selection procedure that processes the N regions from the previous module. This module will select the region that contains the signal altered by the probe vibrator. It will select none of the regions if the probe vibrator doesn't alter the deformation of the monitoring fiber.

Operational procedures may proceed as follows:

Step 1: Using DFOS Systems to Monitor the Vibrations Surrounding a Fiber Cable.

Connect the field fiber to the DFOS system in the remote terminal for real-time monitoring.

Step 2: Pattern Design and Signal Control

To reduce the working time of the vibrator without compromising the visibility on the waterfall image, a special pattern can be used. The main idea for this is to program a metronome that can control the vibration rhythm of a vibrator device and such vibration rhythm can produce a unique signal pattern on the waterfall image.

Design a Pool of Patterns, Maximizing the Detection Rate

The objective for this step is to generate a special pattern with minimum length and maximum uniqueness. When designing the signal, the properties of vibrator (such as inertia) and the properties of DFOS need to be considered. For instance, it is meaningless to generate a 10 Hz square wave because it is impossible to control a vibrator to work at this speed, and such pattern may not be preserved on the waterfall image if the pulse rate of the DFOS is low.

Note that the amplitude of the pattern can be arbitrary, it has no effect on the searching results since we advantageously employ Pearson's correlation coefficients as the metric which has a normalization step embedded.

Figure 3:
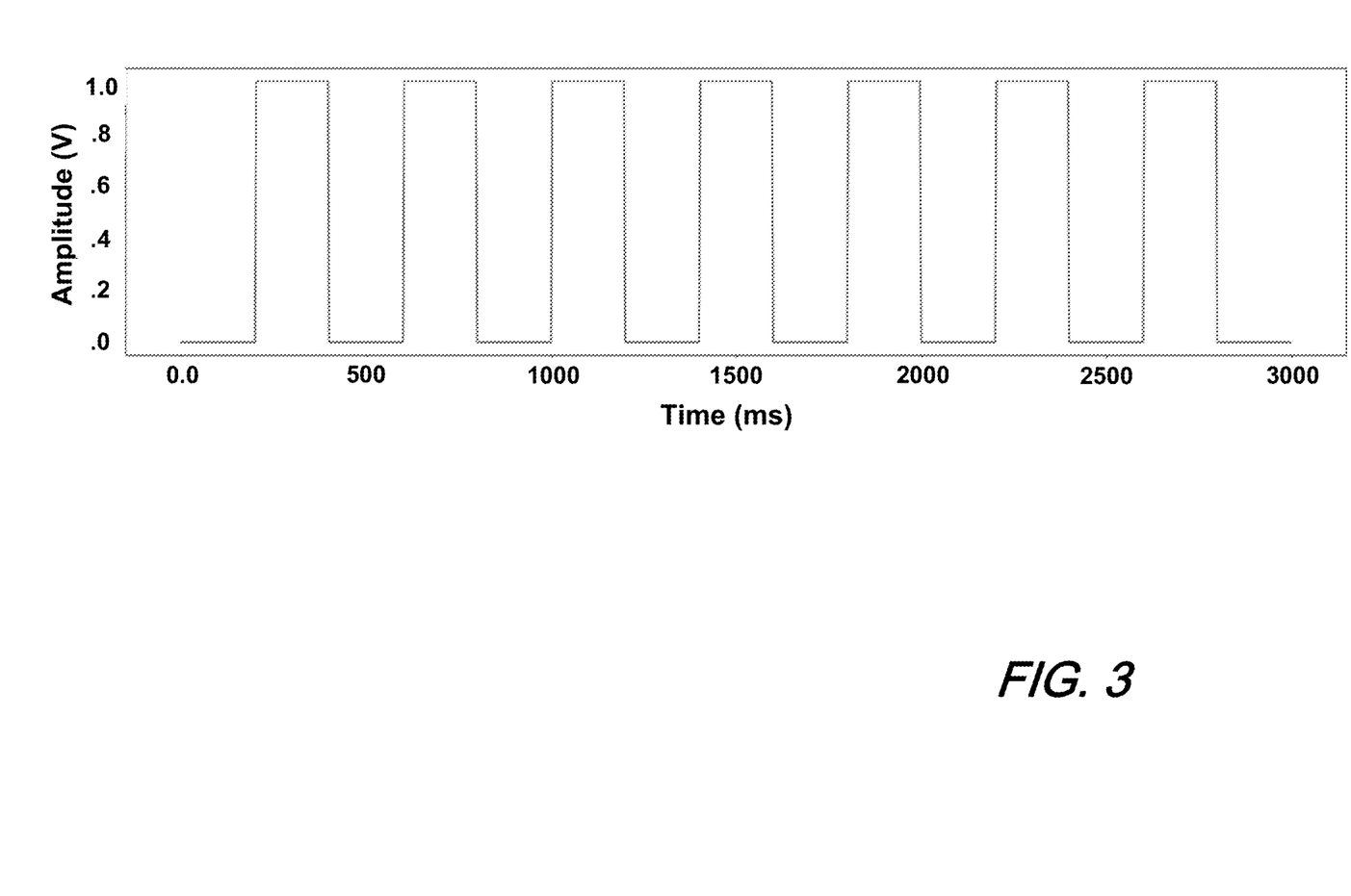
FIG. 3 is a plot of an illustrative periodic square wave signal of 4 second period with same length on/off cycle having a sampling rate of 100 Hz according to aspects of the present disclosure.
Figure 4:
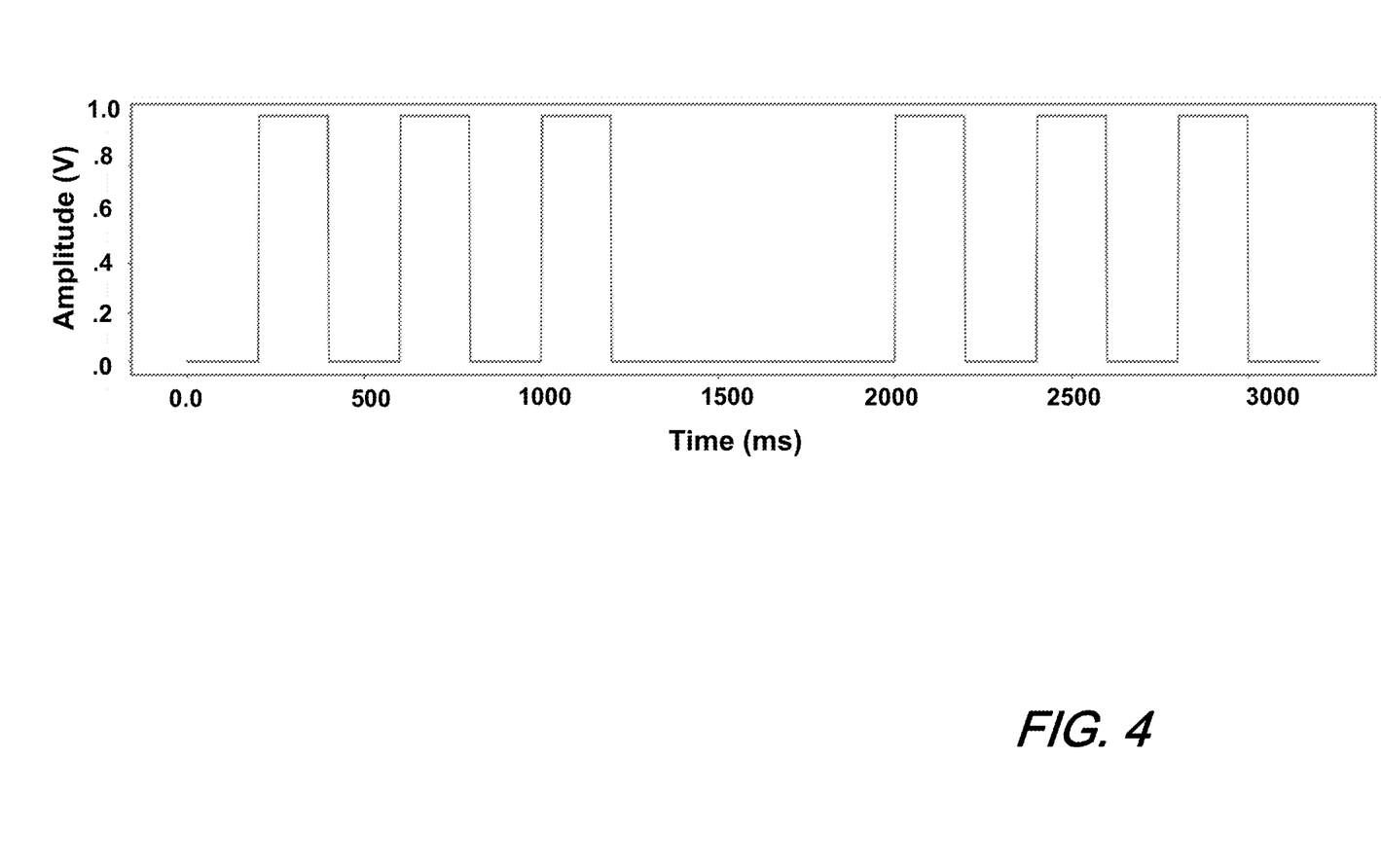
FIG. 4 is a plot of an illustrative periodic square wave signal of 4 second period with same length on/off cycle having a sampling rate of 100 Hz according to aspects of the present disclosure.

FIG. 3 is a plot of an illustrative periodic square wave signal of 4 second period with same length on/off cycle having a sampling rate of 100 Hz according to aspects of the present disclosure; and FIG. 4 is a plot of an illustrative periodic square wave signal of 4 second period with same length on/off cycle having a sampling rate of 100 Hz according to aspects of the present disclosure.

Use ambient data to select patterns, minimizing the false alarm rate

We use the historic real-world data as testing data to evaluate the uniqueness of each designed pattern. The uniqueness is defined as the number of sub-sequences that are highly correlated to the pattern. The testing data should be as complete as possible to cover the various surrounding signals from various kinds of background sources.

Step 3: Using Vibrator as a Signal Source to Generate the Designed Vibration Pattern.

In this step, we program a vibrator device based on the designed patterns such that the signal captured by DFOS is highly correlated to the designed pattern when the vibrator operates. This may be done by using another piece of hardware such as a metronome to control the duration of on/off cycle of the device.

Figure 5A:
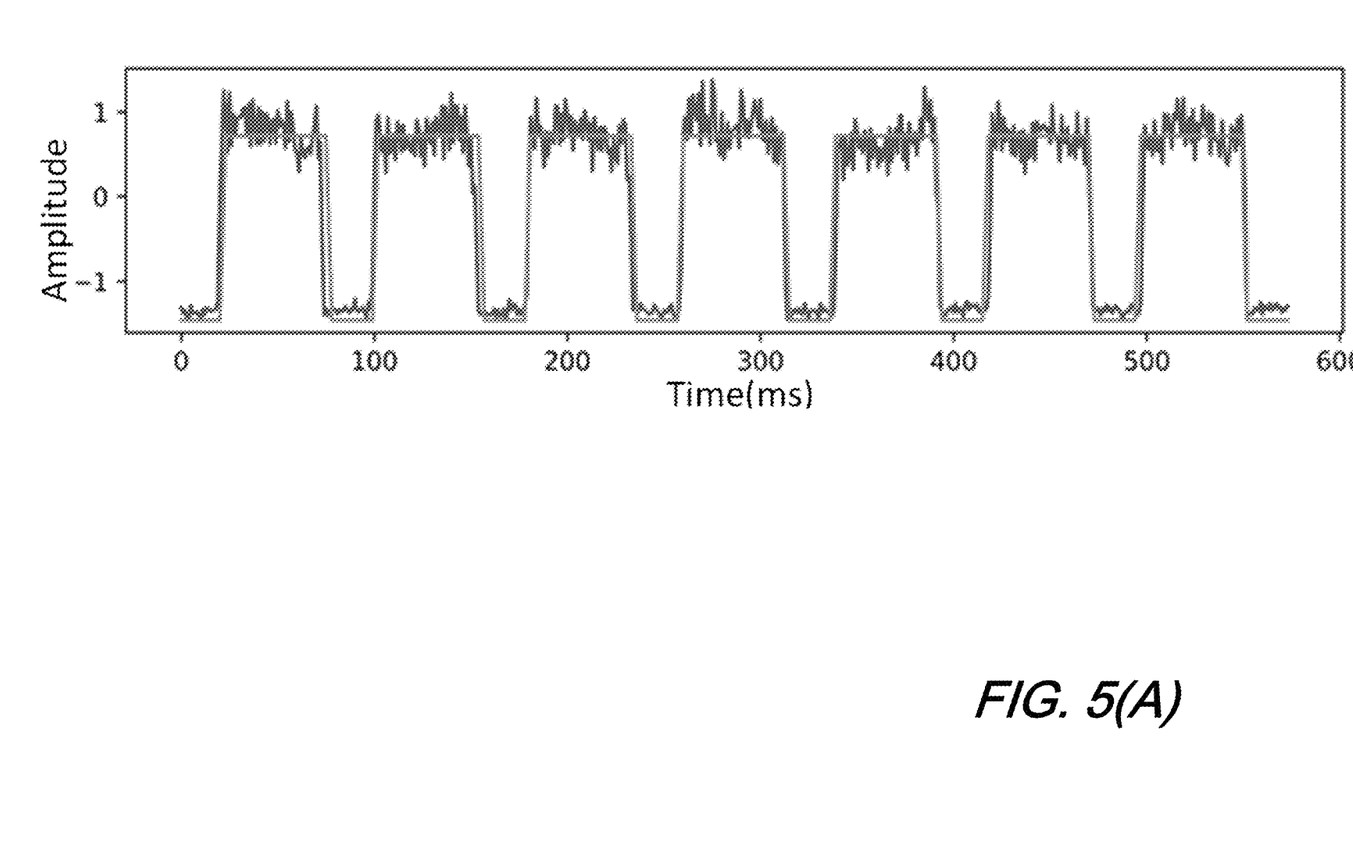
FIG. 5(A) and FIG. 5(B) are a pair of plots of Amplitude vs Time for real vibration signals having designated patterns overlaid after processing with Z-normalization according to aspects of the present disclosure.
Figure 5B:
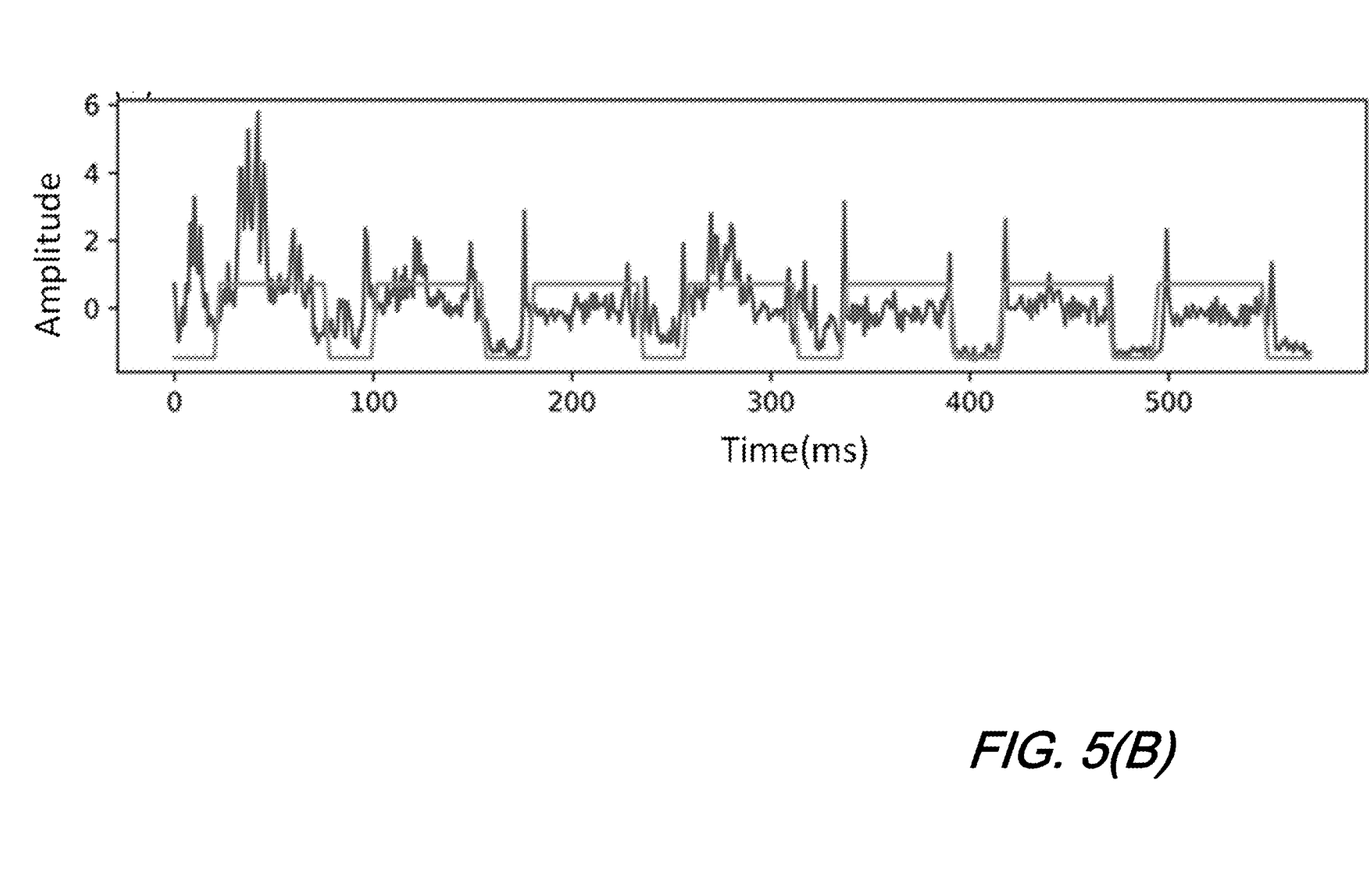

FIG. 5(A) and FIG. 5(B) are a pair of plots of Amplitude vs Time for real vibration signals having designated patterns overlaid after processing with Z-normalization according to aspects of the present disclosure. FIG. 5(A) is an ideal case where the vibration signal and the patter are 94% correlated. FIG. 5(B) is an average case where the signal is contaminated by the traffic noise and it only 41% correlated to the pattern.

Step 4: Template Matching

In FIG. 5(A) and FIG. 5(B), we demonstrate a high-level overview of each component. As shown in these figures, the template matching module is a key component in our software. It can process a waterfall image which is 2D matrix with a designed pattern and find all the signals correlated to the pattern template.

Next, we explain in detail of how we use template matching on distributed fiber optic sensing data.

Explanation of Waterfall Data

As those skilled in the art will appreciate, with an illustrative waterfall image generated from an operating DFOS system, the horizontal axes represent different sensing location on the fiber (collected sensing points) and the vertical axes represent different time stamps, the origin is the latest moment when this image been generated. Each pixel (x, y) on a waterfall image is the amplitude of the signal at sensing point x at time y. Pixels from each column can also be treated as samples of a time-series sequence. If there are total N columns on a waterfall image, then we will have N time series and we apply template matching on these N time series.

Time Series Similarity Search

For this task we utilize a similarity search algorithm under Pearson's correlation for template matching. There are a few advantages to use the Pearson's correlation coefficient as metric.

First, it is based on the lock-step search instead of an Elastic search like DTW. The lock-step search is more suitable for this task which needs one to one alignment as shown in FIG. 4(A) and FIG. 4(B).

Second, and unlike Euclidean distance which takes absolute value, the correlation only considers relative trend between two series. This is crucial since the amplitude of the signal produced by the same vibrator varies at different locations having different underground geological environment.

Finally, from a computation perspective, this algorithm is very efficient, and allows for real-time processing.

Searching Process

Next, we explain how the searching process is performed.

Figure 6:
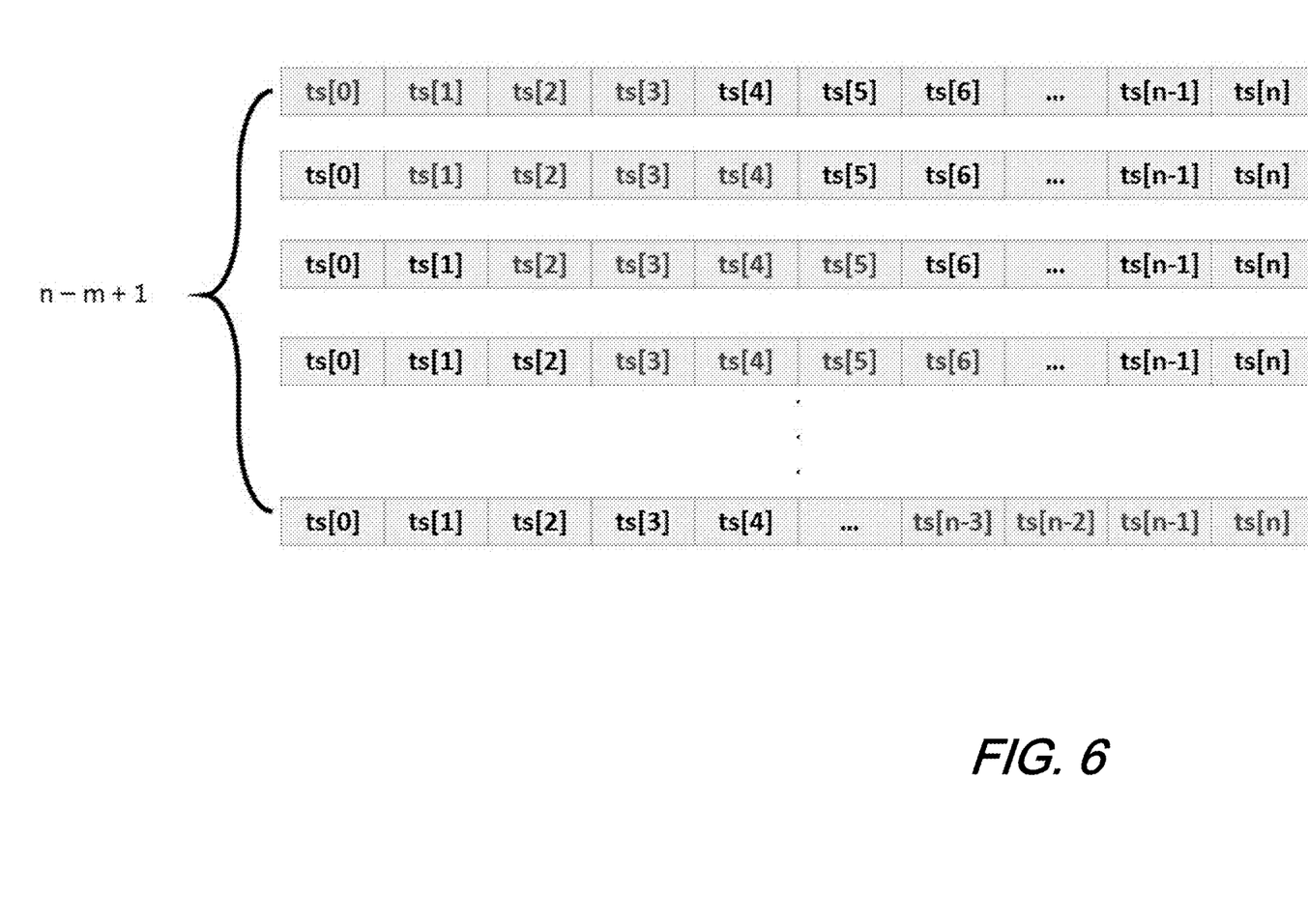
FIG. 6 shows an illustrative sliding window that are iterated all n−m+1 sliding windows in is to find a sliding window position providing maximum correlation to a query according to aspects of the present disclosure.

We need a query as the target to search for, we note it as "q" and assuming it has length m, then we need a longer time search "ts" of length n as the search space in which the algorithm will search for the query. The searching process is carried out by using a sliding window maintained in the ts, this sliding window should have the same length as the q because we use Pearson's correlation as the metric. This sliding window is initially starting at the index 0 which covers the elements from index 0 to index m−1 in ts. At each step i, it will exclude the first element in previous window and cover the element at index m−1+i. FIG. 6 demonstrate how a sliding window shift.

FIG. 6 shows an illustrative sliding window that are iterated all n−m+1 sliding windows in ts to find a sliding window position providing maximum correlation to a query according to aspects of the present disclosure.

For each sliding window we compute the correlation between the elements in sliding window and the query. We iterate all n−m+1 sliding windows in ts to find the sliding window position that give the maximum correlation to the query, we consider the sub-sequence in this sliding window is the most similar time series to the query in ts.

Figure 7A:
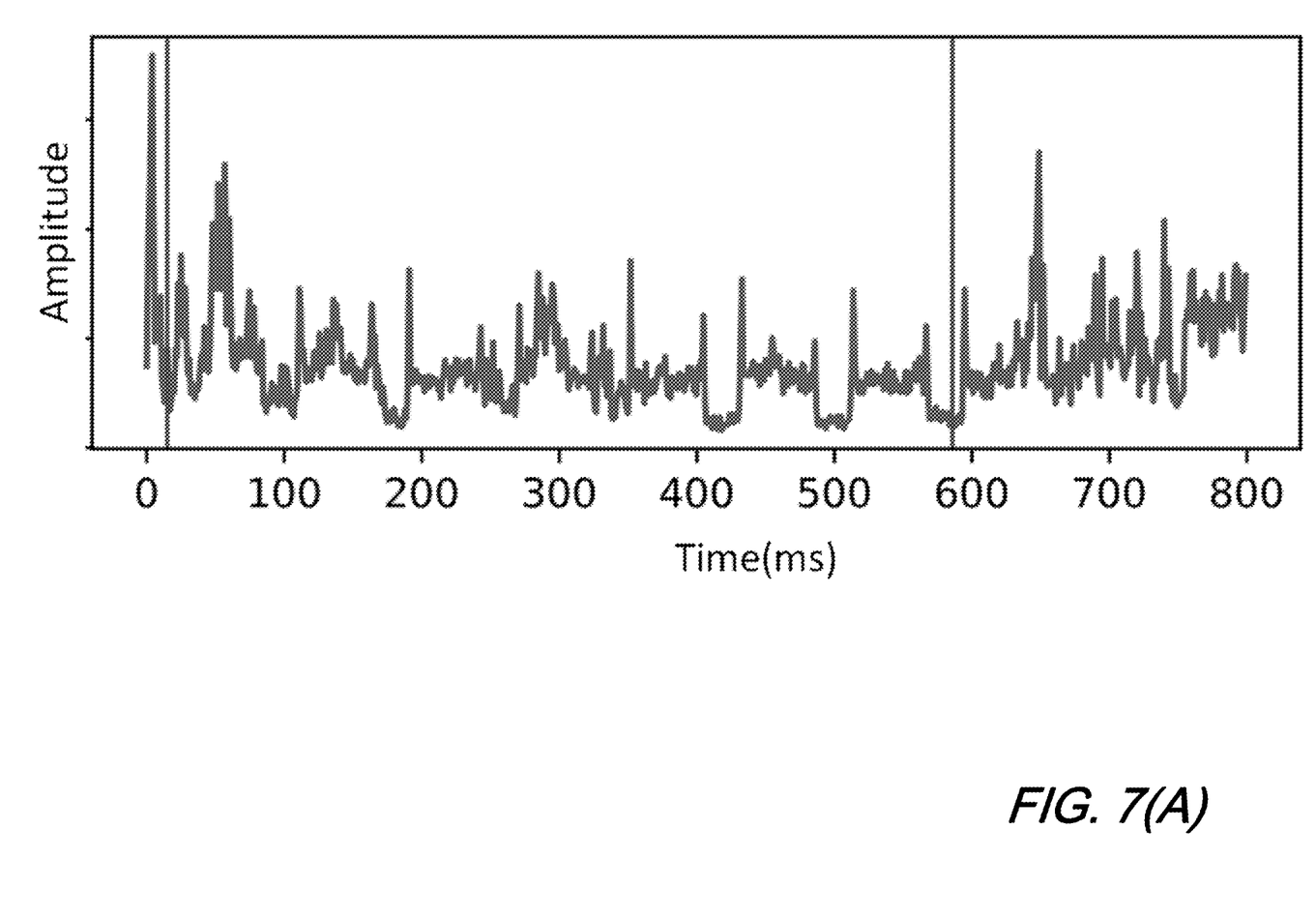
Figure 7B:
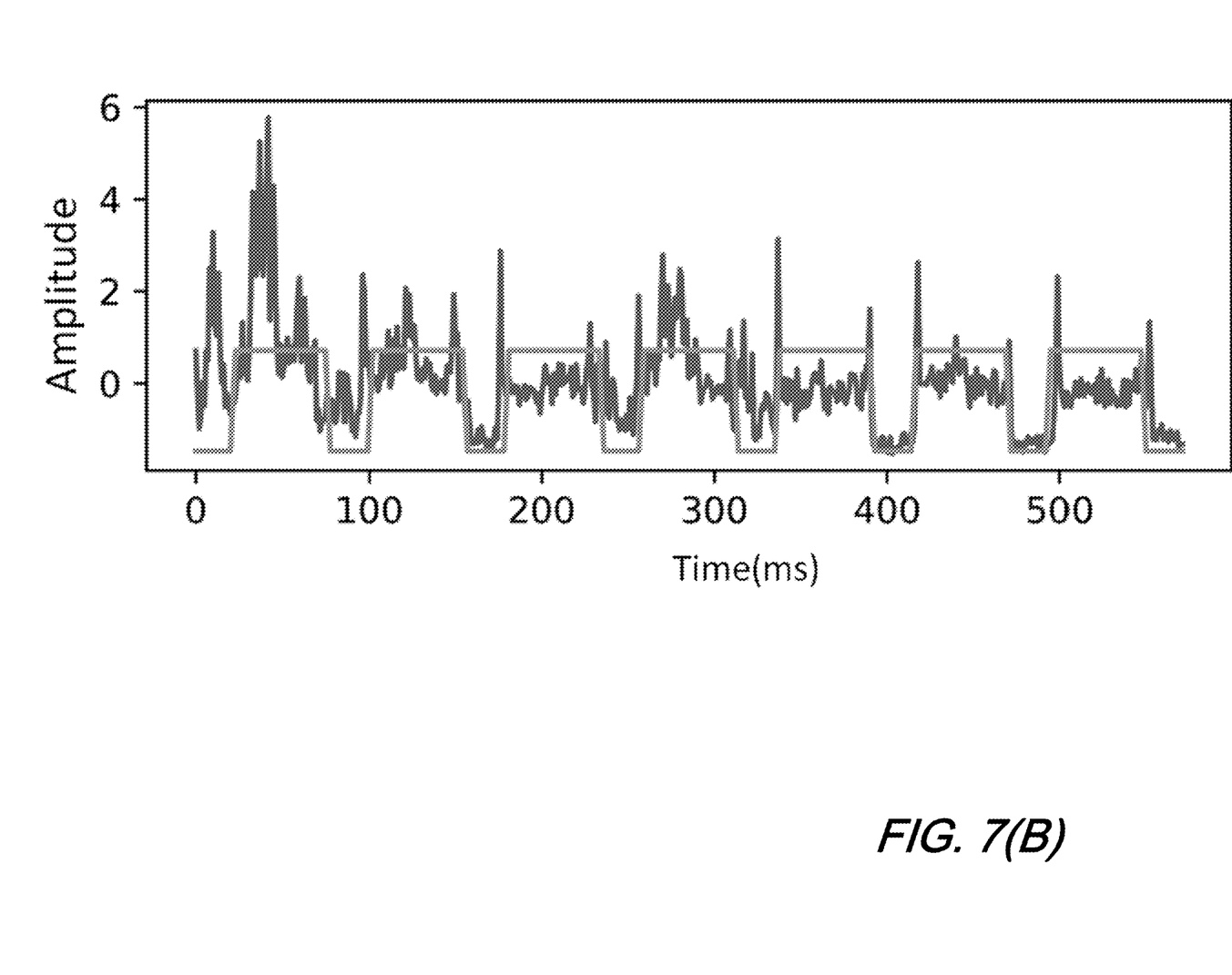

FIG. 7(A) and FIG. 7(B) are a pair of plots of Amplitude vs Time for real vibration signals from a waterfall image in which FIG. 7(A) vertical lines are the starting and ending positions of the sliding window in which, a sub-sequence is most similar to a query and FIG. 7(B) shows both query and sub-sequence overlay according to aspects of the present disclosure.

Then we perform the same operations on each column from the waterfall image. The position of the most similar sub-sequence on each column and the Pearson's correlation value will be kept for further process in the following steps.

Performance Optimization

A waterfall image of 40 second time frame for a 100-km fiber cable contains 25 million pixels, so to achieve the real time processing, the time efficiency needs to be optimized. A state-of-the-art algorithm for generic time series similarity search is MASS. MASS has $O(n\lg n)$ time complexity and $O(m)$ auxiliary space complexity, n is the length of the longer time-series, m is the length of the query. The core for MASS: Using frequency domain multiplication to compute the time domain convolution; and Splitting the data into batches to fully utilize the CPU cache.

Structurally, there is an automated procedure embedded in our procedure that estimates best batch sizes based on the size of input data and the hardware platform. Our optimized implementation toward the underground fiber localization application is significantly faster. It enables us to do real-time processing locally on a regular laptop. A performance comparison between our customized implementation and the open-source implementation of MASS is most favorable.

In summary, our procedure employed in our AI models discovers the most similar sub-sequence to the template on each column of the waterfall image. If there are N columns on the waterfall image, then N tuples will be generated. Each tuple maintains the information: Column index; The starting and ending index of most correlated sub-sequence to the pattern; and Correlation value of the above sub-sequence and pattern.

Step 4: Region Estimation

Based on the results from the previous step, we want to find clusters of sequences that is space continuous and within a same time window, all the sequence within the cluster are all highly correlated. For instance, such clusters may be represented as regions bounded by white lines on waterfall images. The region is our ultimate target instead of the individual sub-sequence since the region is more informative than individual sequence when estimating the target vibration signal in next step. Such region exists because a disturbance affects a range of fiber cable which contains multiple sensing points.

To estimate such regions, we utilize the results from the previous step. We iterate the tuples in descending order based on the correlation value, the iteration will stop when the desired number of regions are reached. Each tuple records the column index, row indexes of the sub-sequence and the Pearson's correlation value. For each tuple, we follow the flow diagram in FIG. 8.

Figure 8:
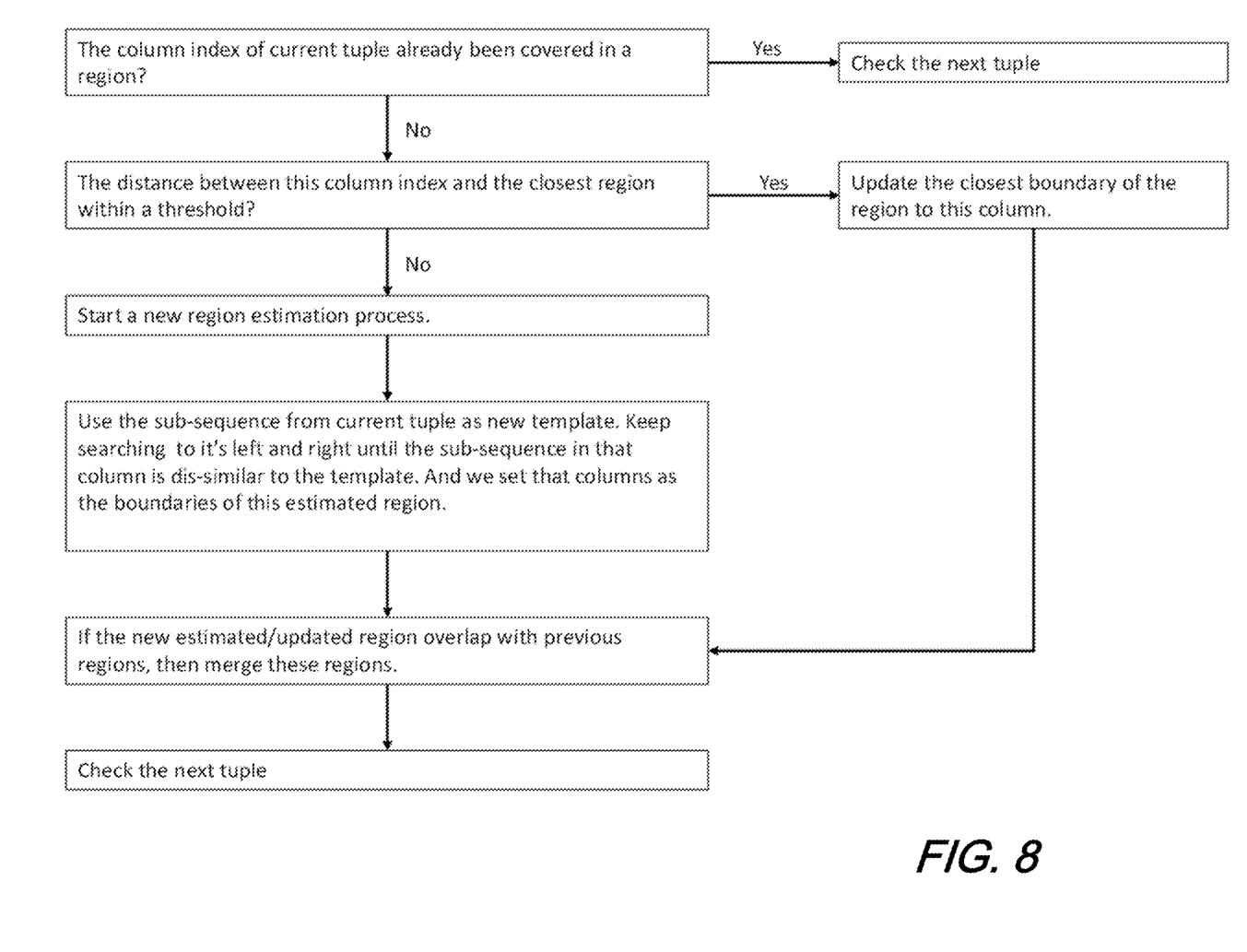
FIG. 8 shows an illustrative flow diagram illustrating tuple iteration according to aspects of the present disclosure.

FIG. 8 shows an illustrative flow diagram illustrating tuple iteration according to aspects of the present disclosure.

To make the located region more complete, we use the real sequence as the template to search its neighboring space instead of the synthetic designed pattern, although the ideal situation (high SNR & low noise) synthetic designed pattern also works fine, in most cases the signal will be distorted by other background noise such as traffic.

Step 5: Region Selection

This final step is to select the region that is corresponding to the target vibration signal or select nothing if none of the regions from previous step are for the vibration signal.

We describe two approaches for this step, one is thresholds-based method, the other one is region overlapping.

Thresholds Based Approach

For the thresholds-based methods, we first compute the following values for each region then decide based on the thresholds, namely, SNR; Regional Pearson's correlation value; and Autocorrelation values.

For SNR, the signal to noise ratio of this region to the surrounding regions. The next value computed is the regional similarity to the designed pattern, this is computed as the Pearson's correlation value of the space and time smoothed sub-sequence in this region to the designed pattern. The space smoothed sequence is generated by (vector) adding all the entire time series from each column within the region and divided by the number of columns. Then performing time-wise smoothing with a sliding mean window on the space smoothed sequence.

Similar to the above computation, we compute on both the top correlated sequence and the time space smoothed version. In here, the complete time series will be used instead of the sub-sequence. This can consider a broader time range since the signal usually generated by a fixed vibration source from the surrounding areas and it usually sustains a long time. The results will be compared with the autocorrelation of the zero-padded designed pattern, the similarity is still measured by the Pearson's correlation.

Finally we set threshold for each measurement to evaluate whether a region is the target region, in other words does the signals in this region aroused by our probe vibrator.

Region Overlapping

Another approach is region overlapping, this is done by probing with 2 or more designed patterns separately at the same location. The ideas behind this are the designed patters should appear at the same location on the waterfall image. And one background noise region has extremely low possibility to correlated with all the designed pattern, in other words, the top few estimated regions for different designed pattern should be separated except for the target regions.

Figure 9:
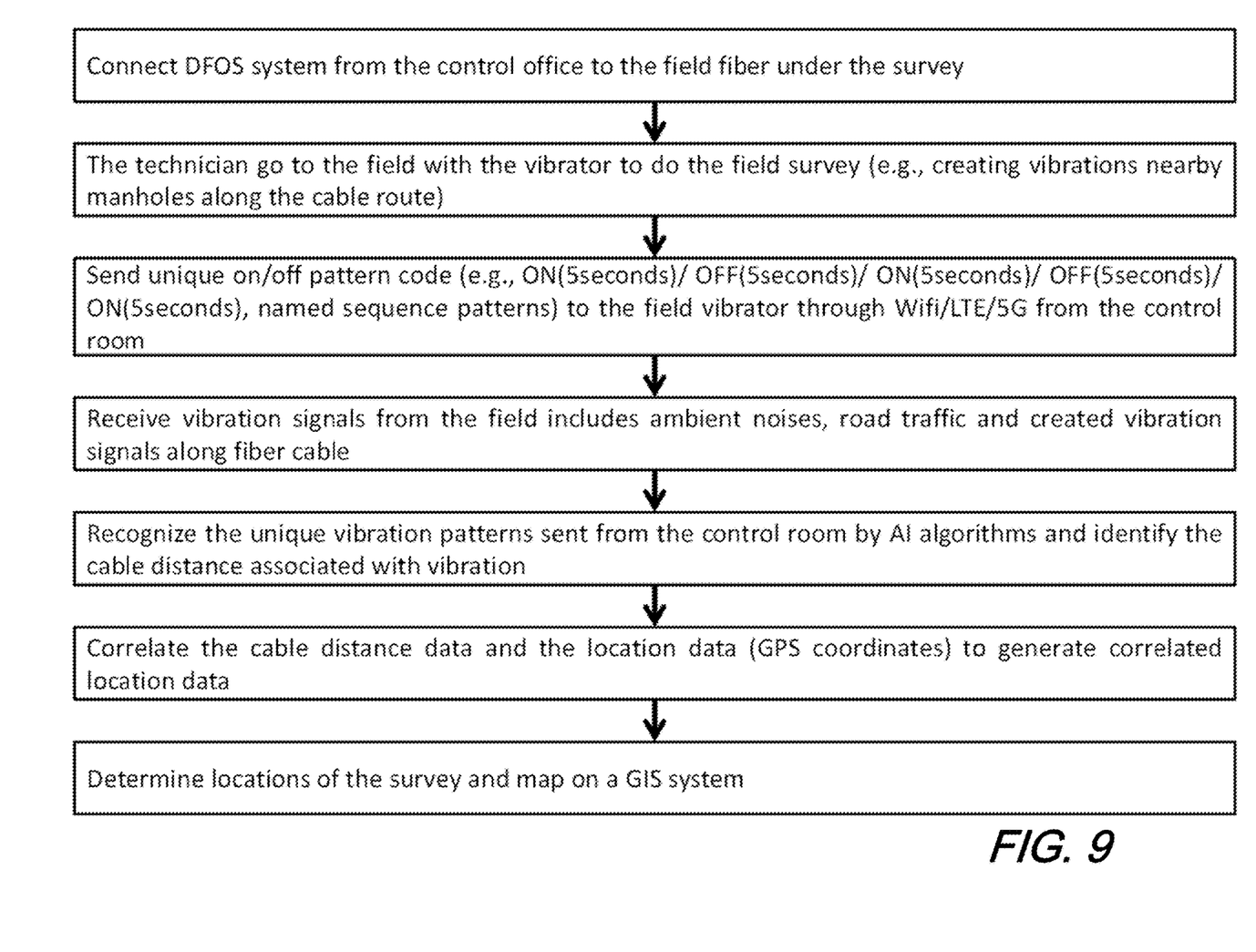
FIG. 9 shows an illustrative flow diagram illustrating overall operation of a system and method according to aspects of the present disclosure.

FIG. 9 shows an illustrative flow diagram illustrating overall operation of a system and method according to aspects of the present disclosure.

With reference to that figure we note that our inventive procedure first connects a DFOS system from a control (central) office to a field test fiber cable.

Next, a technician is deployed with a vibration generator to perform a field survey.

Such survey involves the technician operating the vibration generator proximate to the test fiber cable route—for example—in manholes having the field test fiber deployed therein. This operation involves the generation/transmission of unique on/off (vibration) patterns/codes (e.g. on for 5 seconds, off for 5 seconds . . . etc)—named sequence patterns to the field vibration generator through Wifi/LTE/5G etc from the central office.

As a result of the vibration patterns producing characteristic scattering that is detected during DFOS operation, along with ambient noises including road traffic and other vibration sources occurring along the length of the field test fiber.

Operation of the DFOS and accompanying analysis system recognizes the unique vibration patterns provided by the central office and mechanically effected by the vibration source in the field and detected by the field test fiber. AI algorithms in machine learning procedures may identify distances associated with the vibrations so generated in the field.

These distances are then correlated to cable distance data GPS coordinates to generate—among other items—graphical location indications/data.

Such determined graphical locations may then be displayed on a graphical user interface to direct subsequent technicians to such locations.

At this point, while we have presented this disclosure using some specific examples, those skilled in the art will recognize that our teachings are not so limited. Accordingly, this disclosure should only be limited by the scope of the claims attached hereto.

The invention claimed is:

1. A method for underground cable localization by fast time series template matching and distributed fiber optic sensing (DFOS) comprising:
   providing the DFOS system including
      a length of optical sensor fiber;
      a DFOS interrogator in optical communication with the optical sensor fiber, said DFOS interrogator configured to generate optical pulses, introduce the generated pulses into the length of optical sensor fiber, and receive backscattered signals from the length of the optical sensor fiber; and
      an intelligent analyzer configured to analyze DFOS data received by the DFOS interrogator and determine from the backscattered signals, vibrational activity occurring at locations along the length of the optical sensor fiber;
   deploying a programmable vibration generator to a field location proximate to the length of optical sensor fiber;
   transmitting to the programmable vibration generator a unique, designed, vibration pattern to be generated by the vibration generator; and periodically operating the programmable vibration generator to generate the unique vibration pattern transmitted, wherein the periods of operation are determined by a metronome instrument;

operating the DFOS system and collecting/analyzing the determined vibrational activity to further determine vibrational activity indicative of the unique vibration pattern generated by the vibration generator;

wherein the analyzing the determined vibrational activity includes generating waterfall data image from the backscattered signals and pattern matching of the waterfall data image;

wherein the pattern matching includes correlating a 2D matrix having a designed pattern to a pattern template;

wherein a waterfall data image includes N columns comprising N time series and the pattern matching is applied to all of the N time series; and wherein the pattern matching includes a determination of similar sub-sequences of the pattern template to each of the N columns of the waterfall data image.

2. The method of claim 1 further comprising associating the vibrational activity indicative of the unique vibration pattern generated by the vibration generator to a physical location along the length of the optical sensor fiber.

3. The method of claim 2 wherein the physical location is correlated to a GPS coordinate.

4. The method of claim 3 further comprising relocating the vibration generator to a different location along the length of the optical sensor fiber and transmitting to the vibration generator a different vibration pattern to be generated; and operating the vibration generator and DFOS system to determine the new location of the vibration generator.

5. The method of claim 3 further comprising generating the unique vibration pattern to be transmitted to the vibration generator.

6. The method of claim 1 wherein analyzing the determined vibrational activity includes searching a target signal pattern on collected waterfall data, and outputting N regions on a waterfall data image containing a signal corresponding to the unique vibration pattern generated by the vibration generator.

* * * * *